United States Patent
Opfar et al.

(10) Patent No.: US 11,205,142 B2
(45) Date of Patent: Dec. 21, 2021

(54) WORK ORDER GENERATION SYSTEM

(71) Applicant: The Boeing Company, Chicago, IL (US)

(72) Inventors: Tyler F. Opfar, Huntington Beach, CA (US); Jeffrey D. Moore, Redondo Beach, CA (US); Jeremy J. Siekas, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1211 days.

(21) Appl. No.: 15/637,493

(22) Filed: Jun. 29, 2017

(65) Prior Publication Data
US 2019/0005425 A1 Jan. 3, 2019

(51) Int. Cl.
*G06Q 10/06* (2012.01)
*G06Q 10/00* (2012.01)
*G06Q 10/10* (2012.01)

(52) U.S. Cl.
CPC ..... *G06Q 10/06311* (2013.01); *G06Q 10/103* (2013.01); *G06Q 10/20* (2013.01)

(58) Field of Classification Search
CPC .......... G06Q 10/06311; G06Q 10/103; G06Q 10/20; G06F 30/00
USPC ........................................ 705/7.13
See application file for complete search history.

(56) References Cited

U.S. PATENT DOCUMENTS

| | | | |
|---|---|---|---|
| 2002/0069001 A1* | 6/2002 | Sinex ................. | G06Q 10/1097 701/33.9 |
| 2002/0165742 A1* | 11/2002 | Robins ............... | G06Q 10/0631 705/7.15 |
| 2007/0083280 A1* | 4/2007 | Stumpf ................ | G06Q 10/06 700/95 |
| 2009/0171735 A1* | 7/2009 | Cushing ................ | G06Q 10/00 705/7.12 |
| 2010/0125354 A1* | 5/2010 | Knipfer ............ | G05B 19/41865 700/95 |
| 2011/0219267 A1* | 9/2011 | Migliasso ............. | G06F 11/008 714/37 |
| 2011/0283285 A1* | 11/2011 | Saad ........................ | G05D 1/00 718/102 |

(Continued)

FOREIGN PATENT DOCUMENTS

KR 100786285 B1 * 12/2007
WO WO-2011142933 A2 * 11/2011 ............... G05D 1/00

OTHER PUBLICATIONS

Li, "Using requirement-functional-logical-physical models to support early assembly process planning for complex aircraft systems integration", 2020, http://oro.open.ac.uk/68962/1/02%20JMANSYS% 20Paper_20200110%20-%20final%20accepted.pdf , p. 1-19.*

*Primary Examiner* — Jerry O'Connor
*Assistant Examiner* — James Webb
(74) *Attorney, Agent, or Firm* — Yee & Associates, P.C.

(57) ABSTRACT

A method, system, and apparatus for a work order system for aircraft projects. The work order system comprises a template and a work order manager. The order manager is configured to identify engineering information for an aircraft project including a group of three-dimensional drawings, places the engineering information into the template using an information policy, and create a work order for performing a group of tasks for the aircraft project from the template using a work order policy, enabling performing tasks for the aircraft project on an aircraft.

28 Claims, 9 Drawing Sheets

(56) References Cited

U.S. PATENT DOCUMENTS

2012/0035974 A1* 2/2012 Seybold ............ G06Q 10/06
  705/7.26
2014/0309969 A1* 10/2014 Senesac ............ G06Q 50/30
  703/1
2017/0327247 A1* 11/2017 Dike ............ G05B 19/41865

* cited by examiner

WORK ORDER GENERATION SYSTEM

BACKGROUND INFORMATION

1. Field

The present disclosure relates generally to aircraft, and in particular, to managing tasks performed for maintenance on aircraft using a work order generation system.

2. Background

Maintenance of aircraft may include performing tasks for one or more aircraft projects that include a modification, a reconfiguration, a refurbishment, a maintenance project, or some combination thereof of the aircraft. These aircraft projects may be created by an aircraft manufacturer to increase the performance, safety, aesthetics, or comfort of an aircraft, as well as for other purposes.

Aircraft projects may include, for example, upgrading an in-flight entertainment system, reconfiguring seats in a passenger cabin, refurbishing storage bins, or other types of projects. For example, engineering information may be created to perform tasks to upgrade an in-flight entertainment system. The engineering information may include drawings, instructions, part notes, annotation notes, a bill of materials, part identifiers, or other information used to perform tasks for the aircraft project.

After the aircraft project is created, the aircraft project may be distributed to customers or other parties in a form useable by the customers. For example, a service bulletin is created using the engineering information for distribution. This process, however, is often more time-consuming and tedious than desired. Time and effort is involved in obtaining the engineering information needed for the service bulletin. Further, time and effort to check the service bulletin to make sure that the information in the service bulletin is accurate is often more than desired.

Therefore, it would be desirable to have a method and apparatus that take into account at least some of the issues discussed above, as well as other possible issues. For example, it would be desirable to have a method and apparatus that overcome technical problems with creating service bulletins for aircraft projects.

SUMMARY

An embodiment of the present disclosure provides a work order system for aircraft projects. The work order system comprises a template and a work order manager. The work order manager is configured to identify engineering information for an aircraft project including a group of three-dimensional drawings. The work order manager places the engineering information into the template using an information policy. The work order manager creates a work order for performing a group of tasks for the aircraft project from the template using a work order policy, enabling performing tasks for the aircraft project on an aircraft.

Another embodiment of the present disclosure provides a method for managing work orders. The method comprises identifying engineering information for an aircraft project including a group of three-dimensional drawings. The method places the engineering information into a template using an information policy and creates a work order for performing a group of tasks for the aircraft project from the template using a work order policy, enabling performing tasks for the aircraft project on an aircraft.

Yet another embodiment of the present disclosure provides a method for managing work orders. The method comprises identifying engineering information for an aircraft project including a group of three-dimensional drawings. The method places the engineering information into a template using an information policy. The method sends the template to a work order manager, enabling the work order manager to create a work order using the template.

Still another embodiment of the present disclosure provides an aircraft management system. The aircraft management system comprises a control system configured to identify engineering information for an aircraft project including a group of three-dimensional drawings. The aircraft management system places the engineering information into a template using an information policy. The aircraft management system creates a work order from the template using a work order policy, and controls the performance of tasks for the aircraft project on an aircraft using the work order.

Another embodiment of the present disclosure provides a work order management system. The work order management system comprises a computer-readable storage media, and a template stored on the computer-readable storage media. The template comprises a data structure and program code configured to place engineering information into the data structure as formatted engineering information in the template using an information policy. The formatted engineering information includes instructions and drawings associated with tasks for an aircraft project and the template is used by a work order manager to create a work order for the aircraft project.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a more accurate process for creating service bulletins from engineering information rather than having a human operator create the service bulletin from reviewing the engineering information.

The illustrative embodiments recognize and take into account that currently, a human operator identifies three-dimensional drawings in the engineering information. The human operator then creates two-dimensional drawings based on the three-dimensional drawings for use for the service bulletin. The illustrative embodiments recognize and take into account that this process may be more tedious and time consuming than desired. The illustrative embodiments also recognize and take into account that reviewing a service bulletin is necessary to avoid inconsistencies or errors in the information in the service bulletin.

Figure 1:
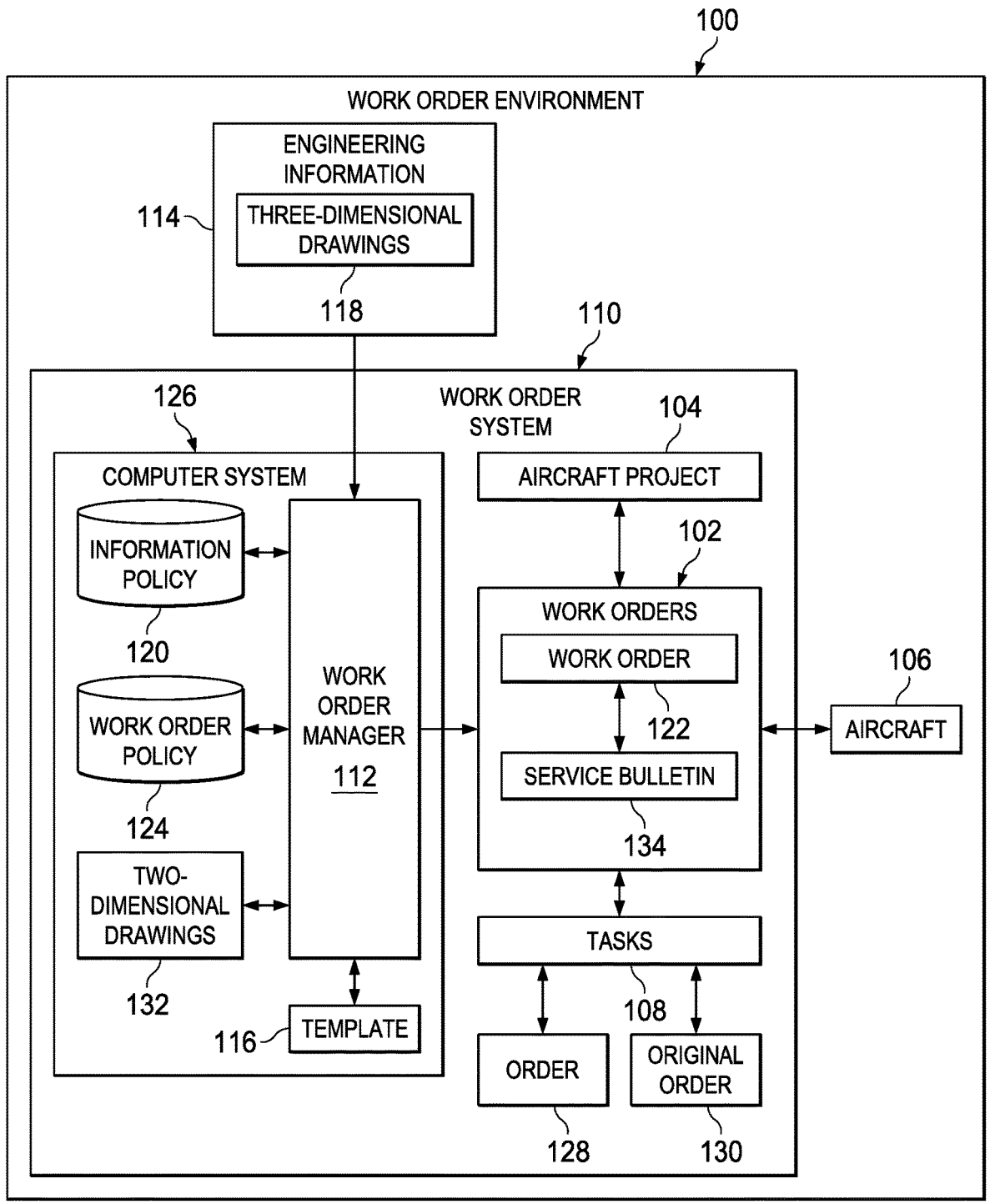
FIG. 1 is an illustration of a block diagram of a work order environment in accordance with an illustrative embodiment.

With reference now to the figures, and in particular, with reference to FIG. 1, an illustration of a block diagram of a work order environment is depicted in accordance with an illustrative embodiment. In this illustrative example, work order environment 100 is an environment in which work orders 102 may be created to perform aircraft project 104 on aircraft 106. As depicted, tasks 108 are performed for work orders 102 to perform aircraft project 104.

In this illustrative example, aircraft project 104 may take several different forms. For example, aircraft project 104 may be selected from a group comprising a modification, a reconfiguration, a refurbishment, and a maintenance project.

In this depicted example, a group of work orders 102 is generated within work order system 110. For example, work order manager 112 in work order system 110 may generate work orders 102 from engineering information 114. In the illustrative examples, information may be located in one or more different sources. For example, the engineering information may be located in at least one of a computer aided design (CAD) system, a part management system, or some other system. These systems may be located in different locations such as an aircraft manufacturer, a third party, a third-party parts supplier, a customer, or some other suitable source.

In this illustrative example, engineering information 114 includes at least one of drawings, instructions, part notes, annotation notes, a bill of materials, part identifiers, or other suitable types of information. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C; or item B and item C. Of course, any combinations of these items may be present. In some illustrative examples, "at least one of" may be, for example, without limitation, two of item A, one of item B, and ten of item C; four of item B and seven of item C; or other suitable combinations.

As depicted, template 116 is employed to reduce the time and effort used to create work orders 102. Additionally, template 116 also may increase the accuracy for work orders 102 and reduce the amount of checking or rechecking of work orders 102 to ensure that work orders 102 are accurate with respect to engineering information 114.

In this illustrative example, work order manager 112 is configured to identify engineering information 114 for aircraft project 104. Engineering information 114 includes a group of three-dimensional drawings 118. As depicted, work order manager 112 is configured to place engineering information 114 into template 116 using information policy 120, and create work order 122 for performing a group of tasks 108 for aircraft project 104 from template 116 using work order policy 124.

As depicted, work order manager 112 performs these operations to enable performing tasks 108 for aircraft project 104 on aircraft 106. As used herein, "a policy" is one or more rules. The policy also may include data or values that are used for applying the rules. A policy may have rules that embody or encompass at least one of a specification, a standard, a regulation, a statute, a law, or some other criteria.

In the illustrative example, engineering information 114 is associated with a group of tasks 108 for work order 122 such that each piece of engineering information 114 is associated with a task in the group of tasks 108.

In this illustrative example, work order manager 112 associates engineering information 114 with the group of tasks 108. This association may be performed using information policy 120. The association of engineering information 114 with tasks 108 may be embodied in template 116.

In other words, engineering information 114 placed into template 116 is associated with tasks 108 within template 116 in this illustrative example. In this manner, template 116 enables easier creation of work order 122 as compared to currently available techniques.

For example, template 116 may associate tasks 108 with engineering information 114 using information policy 120. Information policy 120 may identify items in aircraft 106 by working inward in aircraft 106. For example, information policy 120 specify associating engineering information 114 in the following order (1) aircraft structure as the first work sequence, (2) environmental control subsystems, (3) electrical subsystems, (4) to payload, and (5) interior subsystems. Other rules or orders may be implemented in information policy 120 in other examples.

Information policy 120 also may specify an order for instructions to perform a task in tasks 108. For example, a task for installing a new row of seats may order instructions as follows (1) installing any additional floor beam structure support required, (2) install electrical wiring to the seat, (3) install any floor paneling, (4) install carpet or floor covering, and (5) install the seat.

In this illustrative example, service bulletin 134 may be work order 122 in work orders 102. In other words, service bulletin 134 may be a type of work order created for a specific industry or type of aircraft project 104. In other illustrative examples, work order 122 may be customized for a particular customer. As depicted, service bulletin 134 may include steps for the tasks, drawings, a parts list, a bill of materials, and other information.

Further, in placing engineering information 114 into template 116, work order manager 112 is configured to convert three-dimensional drawings 118 in engineering information 114 into two-dimensional drawings 132 using information policy 120. For example, information policy 120 may specify that the default view for three-dimensional drawings 118 should be used for two-dimensional drawings 132. In another illustrative example, information policy 120 may specify specific views selected from at least one of an isometric view, an exploded view, a top view, a right-side view, a front view, or some other view that is needed for work order 122. In other words, information policy 120 defines the type of two-dimensional drawings 132 needed for work order 122.

As depicted, work order manager 112 may select order 128 for the group of tasks 108. For example, order 128 may be selected using work order policy 124. Work order policy 124 may implement rules on specifying order 128 for the group of tasks 108. Order 128 may be based on dependencies between tasks 108. Further, work order policy 124 may implement customer preferences for order 128 of tasks 108.

In this illustrative example, work order manager 112 selects order 128 by reordering the group of tasks 108 from original order 130. For example, original order 130 may be in an order based on industry standards, a data input sequence, or some other input that specifies original order 130. Order 128 may be based on a desired order for the group of tasks 108 as specified by a customer.

Work order manager 112 may be implemented in software, hardware, firmware, or a combination thereof. When software is used, the operations performed by work order manager 112 may be implemented in program code configured to run on hardware, such as a processor unit. When firmware is used, the operations performed by work order manager 112 may be implemented in program code and data and stored in persistent memory to run on a processor unit. When hardware is employed, the hardware may include circuits that operate to perform the operations in work order manager 112.

In the illustrative examples, the hardware may take a form selected from at least one of a circuit system, an integrated circuit, an application specific integrated circuit (ASIC), a programmable logic device, or some other suitable type of hardware configured to perform several operations. With a programmable logic device, the device may be configured to perform the number of operations. The device may be reconfigured at a later time, or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As depicted, work order manager 112 may be implemented within computer system 126. In this illustrative example, computer system 126 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with creating service bulletins for aircraft. As a result, one or more technical solutions may provide a technical effect enabling creating work orders 102 in a manner that is at least one of more efficient or more accurate, as compared to current techniques.

As a result, computer system 126 operates as a special purpose computer system in which work order manager 112 in computer system 126 enables creating work orders 102 using template 116 in a manner that is at least one of faster or more accurate than current techniques for creating work orders 102. In particular, work order manager 112 transforms computer system 126 into a special purpose computer system, as compared to currently available general computer systems that do not have work order manager 112.

Figure 2:
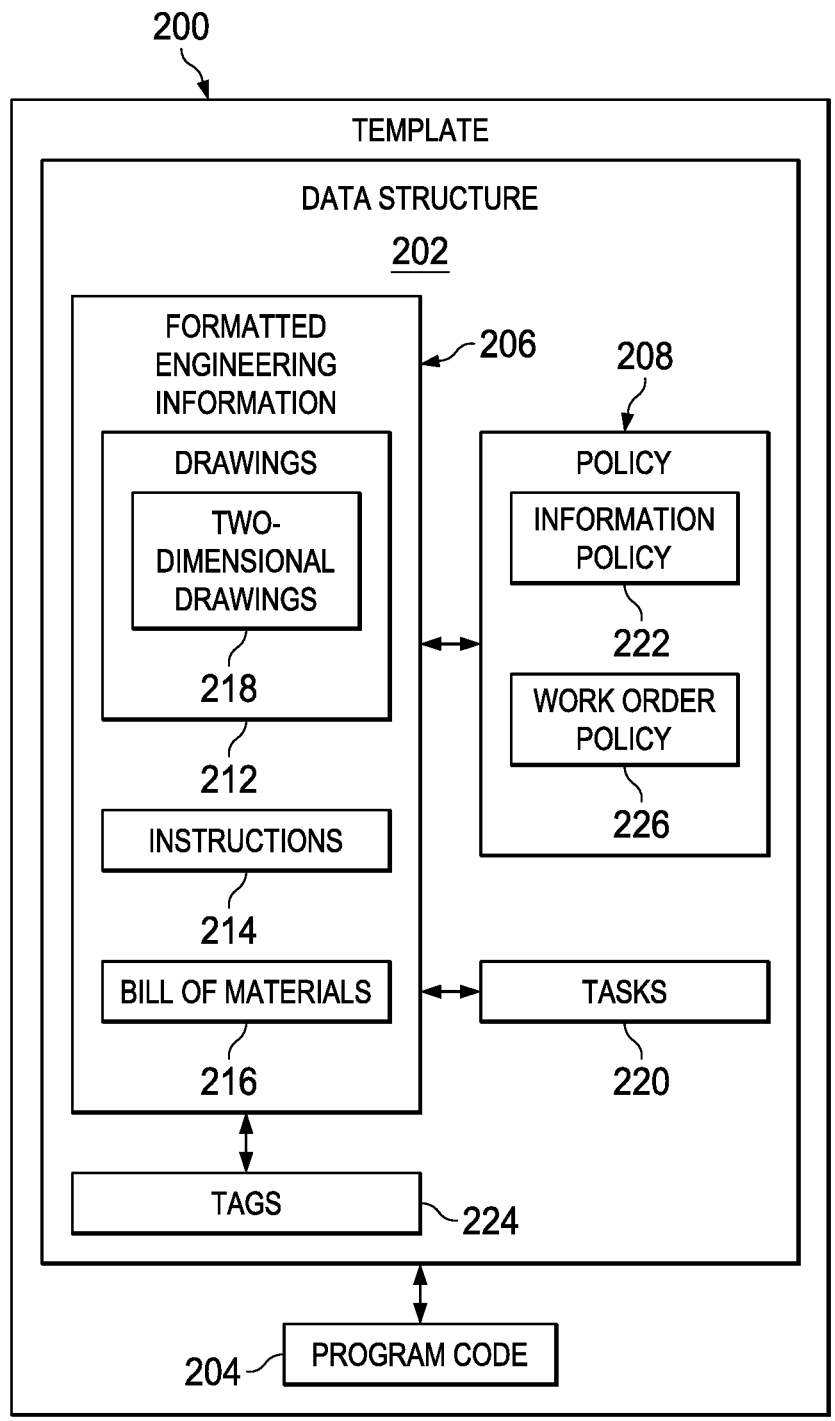
FIG. 2 is an illustration of a block diagram of a template in accordance with an illustrative embodiment.

With reference next to FIG. 2, an illustration of a block diagram of a template is depicted in accordance with an illustrative embodiment. In this illustrative example, template 200 is an example of one implementation for template 116 in FIG. 1.

As depicted, template 200 is comprised of several different components. In this illustrative example, template 200 includes data structure 202 and program code 204. Data structure 202 contains formatted engineering information 206 and policy 208. Formatted engineering information 206 is created using engineering information 114 in FIG. 1.

As depicted, formatted engineering information 206 may be engineering information 114 114 in FIG. 1 associated with tags. These tags may be used to generate work orders 102 in FIG. 1. Formatted engineering information 206 in template 200 is divided into categories that include drawings 212, instructions 214, and bill of materials 216.

In this example, drawings 212 may take the form of two-dimensional drawings 218. Two-dimensional drawings 218 are created from three-dimensional drawings 118 in engineering information 114 in FIG. 1.

Instructions 214 describe operations that are performed for an aircraft project. Instructions 214 may be created from translating engineering information 114 114 in FIG. 1 from one language to another language, in some illustrative examples. In other illustrative examples, translation is unnecessary.

In this illustrative example, bill of materials 216 identifies parts, raw materials, assemblies, and quantities needed to perform operations in instructions 214. Bill of materials 216 may be used to generate a production order.

As depicted, formatted engineering information 206 is associated with tasks 220. The association of formatted engineering information 206 is performed using policy 208. The association of formatted engineering information 206 with tasks 220 facilitates generating work orders more easily. For example, with the association of formatted engineering information 206 with tasks 220, reordering of tasks for work orders may be performed more easily and quickly, as compared to currently used techniques. The selection of the order of tasks 220 may be performed using policy 208.

In this illustrative example, program code 204 is configured to place engineering information 114 in FIG. 1 into template 200 in the form of formatted engineering information 206. As depicted, program code 204 may take various forms. For example, program code 204 may be a script, JavaScript, a markup language, extensible markup language (XML), asynchronous JavaScript and extensible markup language (AJX), or other suitable languages.

Program code 204 may identify which pieces of engineering information 114 in FIG. 1 should be placed into which categories in template 200 to form formatted engineering information 206. The identification and placement of the pieces of engineering information 114 in FIG. 1 into template 200 to form formatted engineering information 206 may be made to use information policy 222 in policy 208. Additionally, program code 204 may add tags 224 to formatted engineering information 206. Tags 224 may be used to create a work order from formatted engineering information 206 in template 200.

Additionally, formatted engineering information 206 may involve converting units, currency, and other types of changes that are performed for use in creating a work order from template 200. These different conversions also may be specified through information policy 222.

Template 200 with formatted engineering information 206 is used to create work orders. With the association of formatted engineering information 206 with tasks 220, work orders may be created to meet different specifications, industries standards, customer preferences, and other requirements as compared to creating work orders using currently available techniques that do not involve template 200. The creation of work orders may be performed using program code 204, work order policy 226, and policy 208. Work order policy 226 may specify different orders for a group of tasks 220 depending on the dependency of tasks 220 on each other and customer preferences.

Figure 3:
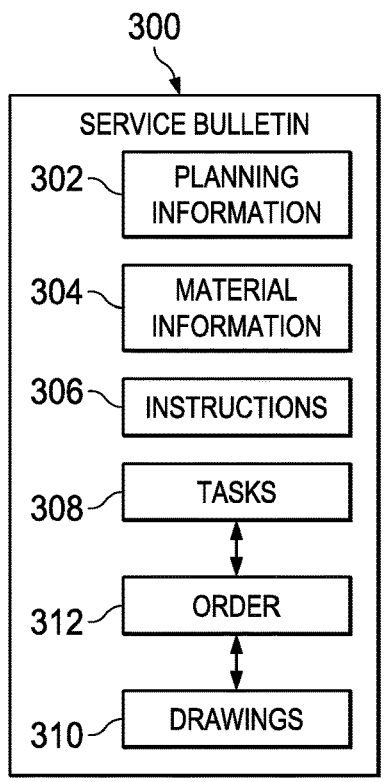
FIG. 3 is an illustration of a block diagram of a service bulletin in accordance with an illustrative embodiment.

With reference now to FIG. 3, an illustration of a block diagram of a service bulletin is depicted in accordance with an illustrative embodiment. In this illustrative example, service bulletin 300 is an example of a work order generated using template 200 in FIG. 2. Service bulletin 300 is an example of one implementation for service bulletin 134 in FIG. 1. In this illustrative example, work order manager 112 in FIG. 1 uses template 200 in FIG. 2 to create service bulletin 300 in FIG. 3. For example, work order manager 112 in FIG. 1 may extract formatted engineering information 206 for use in different portions of service bulletin 300 through tags 224 put into formatted engineering information 206 by program code 204 in template 200 in FIG. 2. For example, tags 224 in FIG. 2 may take the form of extensible markup language tags used by work order manager 112 in FIG. 1 to extract portions of formatted engineering information 206 in FIG. 2 to create service bulletin 300.

In this illustrative example, service bulletin 300 has several different sections. As depicted, service bulletin 300 includes planning information 302, material information 304, instructions 306, tasks 308, and drawings 310. As depicted in this example, all of the information in service bulletin 300 is obtained from template 200 in FIG. 2.

Planning information 302 comprises information for performing the aircraft project. Planning information 302 includes information about airplanes for which the project is applicable to, such as an amount of manpower needed, electrical loads on the aircraft, changes in weight in the aircraft, references, and other information.

Material information 304 identifies parts necessary to perform the aircraft project. Material information 304 may comprise a bill of materials. Instructions 306 are instructions on performing the operations for different tasks. Tasks 308 group the instructions into pieces of work for the aircraft project.

Tasks 308 list the different tasks that are performed for the aircraft project. Tasks 308 are in order 312. With the use of template 200 in FIG. 2, order 312 may be more easily customized as compared to using current processes for creating service bulletins. For example, a service bulletin or work order may be customized for different customers from the same template. Part of this customization is enabled through the association of tasks 220 with formatted engineering information 206 in template 200 in FIG. 2. Tasks 220 may be reordered with a corresponding reordering of formatted engineering information 206 associated with tasks 308.

Drawings 310 are drawings that show parts and the assembly of parts for the aircraft project that is the subject of service bulletin 300. In these illustrative examples, drawings 310 are two-dimensional drawings derived from template 200 in FIG. 2.

The illustration of work order environment 100 in FIG. 1 and the different components in FIGS. 1-3 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, template 200 in FIG. 2 may include other categories of engineering information such as annotation notes, part identifiers, part notes, or other types of engineering information that may be used in creating a work order. In another illustrative example, different functions of work order manager 112 in FIG. 1 may be distributed in different locations. For example, work order manager 112 in FIG. 1 may include the component at a manufacturer that creates templates, such as template 200 in FIG. 2. The template may be distributed to customers or third parties. Those customers or third parties may have another component of work order manager 112 in FIG. 1 that creates work orders for service bulletins from templates.

As another example, engineering information 114 may include two-dimensional drawings in addition to or in place of three-dimensional drawings 118 in FIG. 1. If two-dimensional drawings are present, work order manager 112 may place those two-dimensional drawings into template 116 using information policy 120 in FIG. 1.

Figure 4:
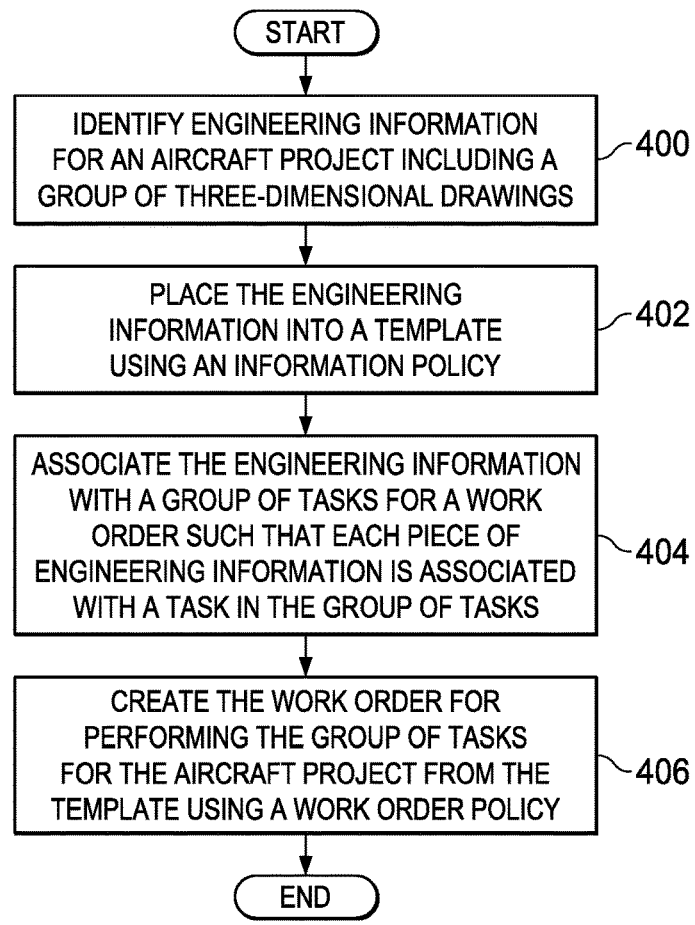
FIG. 4 is an illustration of a flowchart of a process for managing work orders in accordance with an illustrative embodiment.

Turning next to FIG. 4, an illustration of a flowchart of a process for managing work orders is depicted in accordance with an illustrative embodiment. The process illustrated in FIG. 4 may be implemented in work order manager 112 shown in block form in FIG. 1. The different operations may be implemented in software, hardware, or some combination thereof to perform the different operations.

The process begins by identifying engineering information for an aircraft project including a group of three-dimensional drawings (operation 400). The process places the engineering information into a template using an information policy (operation 402). The process associates the engineering information with a group of tasks for a work order such that each piece of engineering information is associated with a task in the group of tasks (operation 404).

The process creates the work order for performing the group of tasks for the aircraft project from the template using a work order policy (operation 406). The process terminates thereafter. The process in FIG. 4 enables performing tasks for the aircraft project on an aircraft. The process may be used to control performance of the aircraft project using the work order.

Figure 5:
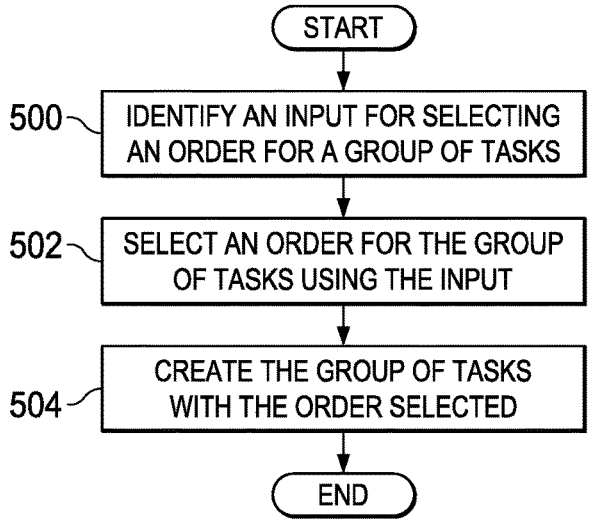
FIG. 5 is an illustration of a flowchart of a process for placing tasks in order in accordance with an illustrative embodiment.

With reference now to FIG. 5, an illustration of a flowchart of a process for placing tasks in order is depicted in accordance with an illustrative embodiment. The process illustrated in FIG. 5 may be implemented in work order manager 112 shown in block form in FIG. 1. The different operations may be implemented in software, hardware, or some combination thereof to perform the different operations.

The process begins by identifying an input for selecting an order for a group of tasks (operation 500). In this illustrative example, the input for selecting the order in which the group of tasks is to be performed may come from different sources. For example, the input may be obtained from a policy, such as work order policy 124 in FIG. 1. The policy may specify different orders for the group of tasks depending on the dependency of the tasks on each other and customer preferences. In another illustrative example, the input may be a user input, a file, a table, or some other source indicating the order for the group of tasks.

The process selects an order for the group of tasks using the input (operation 502). The process then creates the group of tasks with the order selected (operation 504). The process terminates thereafter.

In the flowchart in FIG. 5, the group of tasks may already have an original order. In this case, the order is selected by reordering the group of tasks from the original order.

Figure 6:
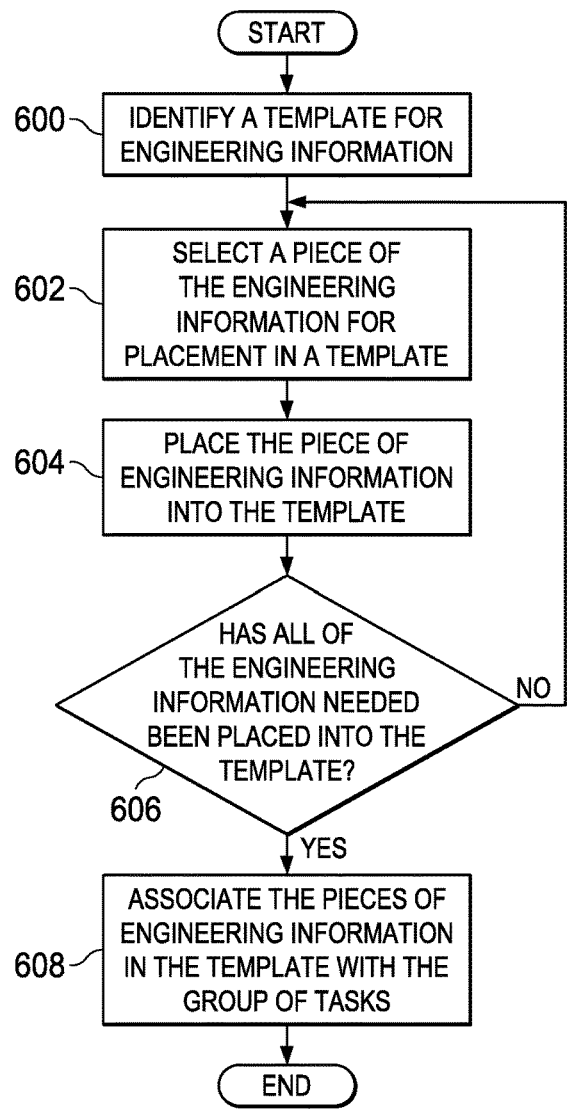
FIG. 6 is an illustration of a flowchart of a process for placing engineering information into a template in accordance with an illustrative embodiment.

Turning now to FIG. 6, an illustration of a flowchart of a process for placing engineering information into a template is depicted in accordance with an illustrative embodiment. The process illustrated in FIG. 6 may be implemented in work order manager 112 shown in block form in FIG. 1. The different operations may be implemented in software, hardware, or some combination thereof to perform the different operations.

The process begins by identifying a template for engineering information (operation 600). The template may be selected any number of different ways. For example, the template may be selected for a particular customer. Different clients may have different templates to customize work orders generated for those customers.

The process selects a piece of the engineering information for placement in a template (operation 602). The selection of the piece of engineering information may be made using an information policy. This information policy may be integrated as part of the template in some illustrative examples. The information policy is used to select the different pieces of engineering information that are needed to fill the template. Further, the information policy may also identify locations for the pieces of engineering information.

Thereafter, the piece of engineering information is placed into the template (operation 604). This placement of the piece of engineering information also may include adding tags or other information that may be used to process the template to generate a work order. For example, extensible markup language (XML) tags may be added to a piece of information using the information policy.

The process determines whether all of the engineering information needed has been placed into the template (operation 606). If additional information is needed, the process returns to operation 602 to select another piece of engineering information for the template.

Otherwise, if all of the engineering information needed has been placed into the template in step 606, the process associates the pieces of engineering information in the template with the group of tasks (operation 608). In operation 608, the pieces of engineering information are associated with the group of tasks for the work order such that each piece of engineering information is associated with a task in the group of tasks. More than one piece of engineering information may be associated with a task. The process terminates thereafter. At this point, the template has been filled with engineering information and is ready for further processing, such as generating a work order.

Figure 7:
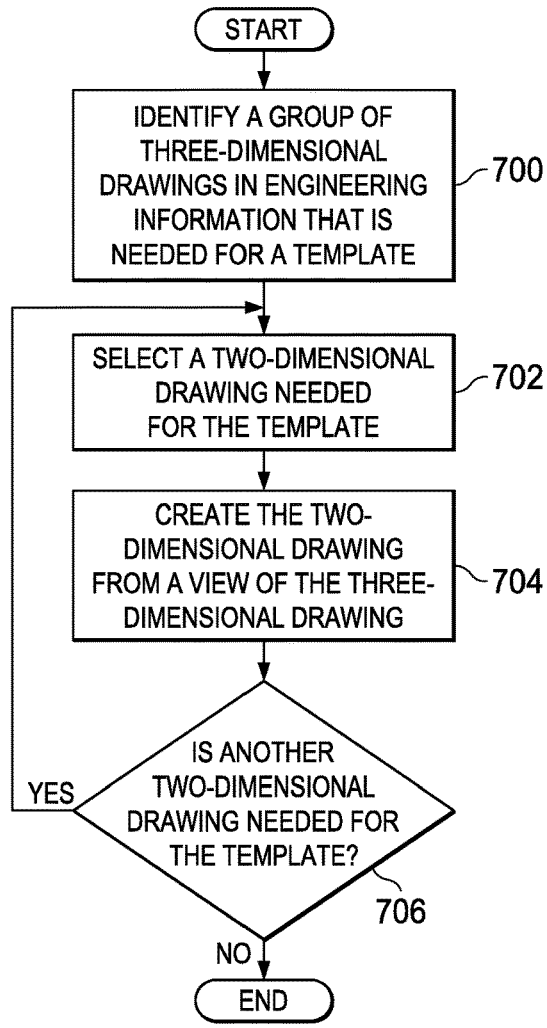
FIG. 7 is an illustration of a flowchart of a process for placing a drawing into a template in accordance with an illustrative embodiment.

With reference next to FIG. 7, an illustration of a flowchart of a process for placing a drawing into a template is depicted in accordance with an illustrative embodiment. The process illustrated in FIG. 7 may be implemented in work order manager 112 shown in block form in FIG. 1. The different operations may be implemented in software, hardware, or some combination thereof to perform the different operations.

The process begins by identifying a group of three-dimensional drawings in engineering information that is needed for a template (operation 700). Operation 700 is performed using an information policy in this illustrative example. The information policy defines two-dimensional views that are needed for the template.

The process selects a two-dimensional drawing needed for the template (operation 702). The two-dimensional drawing may be, for example, a default view in a three-dimensional drawing in the engineering information. In other illustrative examples, the views may be selected to customize the template for a particular client, an industry standard, a specification, a regulation, or other requirement for creating a work order.

The process creates the two-dimensional drawing from a view of the three-dimensional drawing (operation 704). A determination is made as to whether another two-dimensional drawing is needed for the template (operation 706). If another two-dimensional drawing is needed, the process returns to operation 702. Otherwise, the process terminates.

Figure 8:
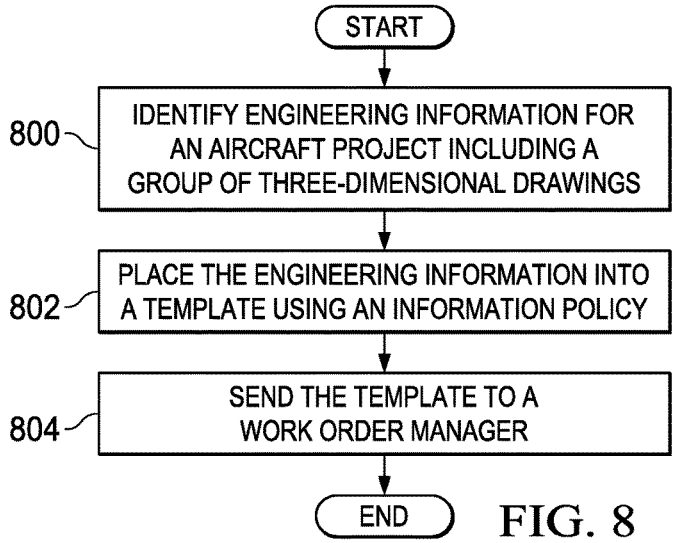
FIG. 8 is an illustration of a flowchart of a process for managing work orders in accordance with an illustrative embodiment.

With reference next to FIG. 8, an illustration of a flowchart of a process for managing work orders is depicted in accordance with an illustrative embodiment. The process illustrated in FIG. 8 may be implemented in work order manager 112 shown in block form in FIG. 1. The different operations may be implemented in software, hardware, or some combination thereof to perform the different operations.

The process begins by identifying engineering information for an aircraft project including a group of three-dimensional drawings (operation 800). The process places the engineering information into a template using an information policy (operation 802). The process sends the template to a work order manager (operation 804). The process terminates thereafter. The work order manager receiving a template is another work order manager that is configured to generate work orders. In this manner, the process illustrated in FIG. 8 enables the work order manager receiving the template to create a work order using the template.

Figure 9:
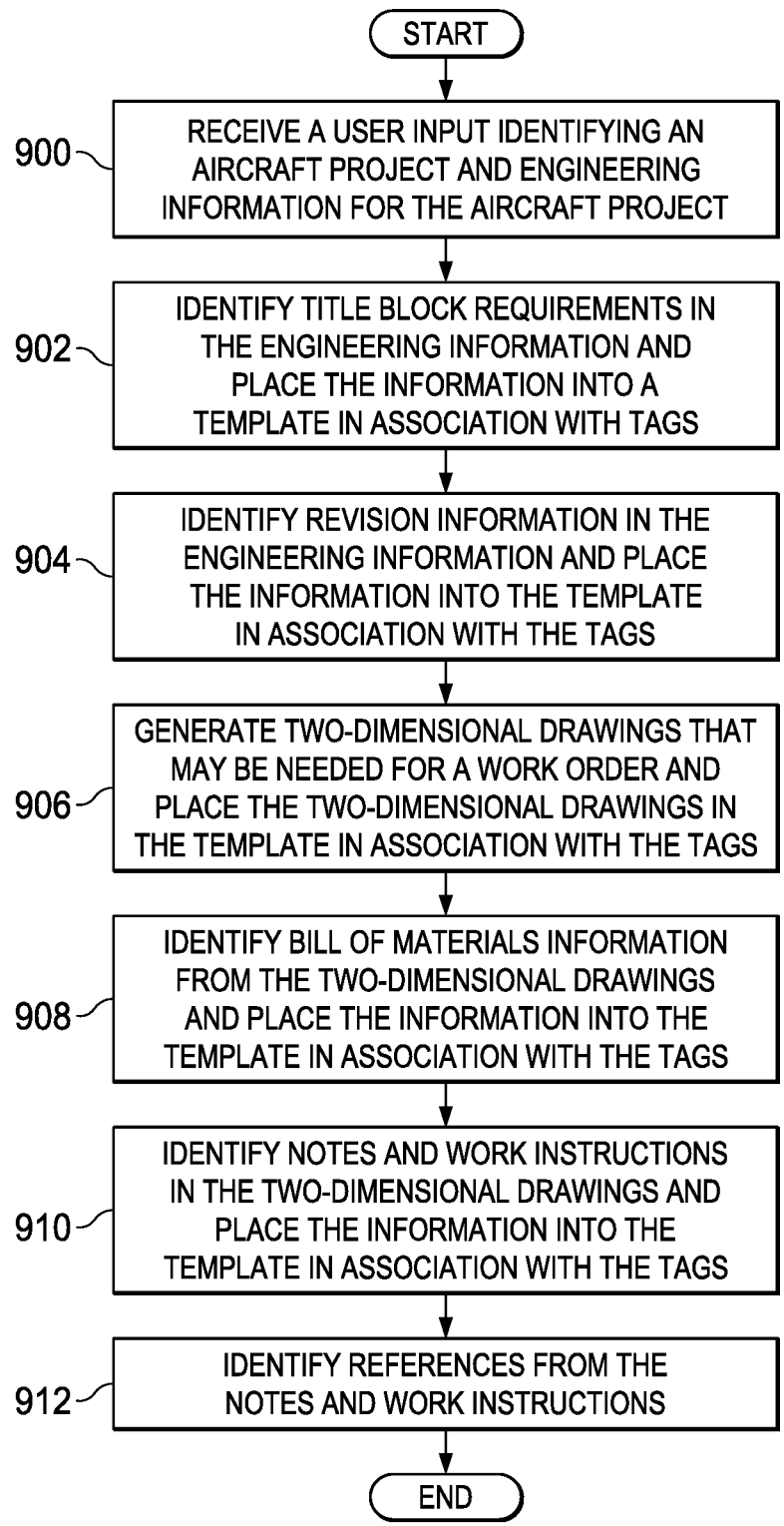
FIG. 9 is an illustration of a flowchart of a process for generating a template in accordance with an illustrative embodiment.

With reference now to FIG. 9, an illustration of a flowchart of a process for generating a template is depicted in accordance with an illustrative embodiment. The process illustrated in FIG. 9 may be implemented in work order manager 112 shown in block form in FIG. 1. The different operations may be implemented in software, hardware, or some combination thereof to perform the different operations. In this illustrative example, the template is filled with formatted engineering information. In this particular example, formatted engineering information is engineering information associated with tags.

The process begins by receiving a user input identifying an aircraft project and engineering information for the aircraft project (operation 900). The process identifies title block requirements in the engineering information and places the information into a template in association with tags (operation 902). In this example, the title block requirements specify template tags that enable grouping of templates to work orders or multiple work orders.

The process then identifies revision information in the engineering information and places the information into the template in association with the tags (operation 904). In operation 904, the revision information may be found in three-dimensional drawings and associated with the revision tag in the template.

The process generates two-dimensional drawings that may be needed for a work order and places the two-dimensional drawings in the template in association with the tags (operation 906). The two-dimensional drawings are associated with the tags that are later used to generate work orders. In this example, the drawings are associated with requirements tags. The process identifies bill of materials information from the two-dimensional drawings and places the information into the template in association with the tags (operation 908).

The process identifies notes and work instructions in the two-dimensional drawings and places that information into the template in association with the tags (operation 910). This information is associated with the tags for later use in generating work orders. The process then identifies references from the notes and work instructions (operation 912). In operation 912, references to other documents or information is identified and those references are placed into the template in association with the tags. The reference in the template may be a pointer universal resource locator or other identifier. In other examples, the reference may be the reference information. The process terminates thereafter. In this manner, the template may be generated with formatted engineering information that may be used to generate a work order.

Figure 10:
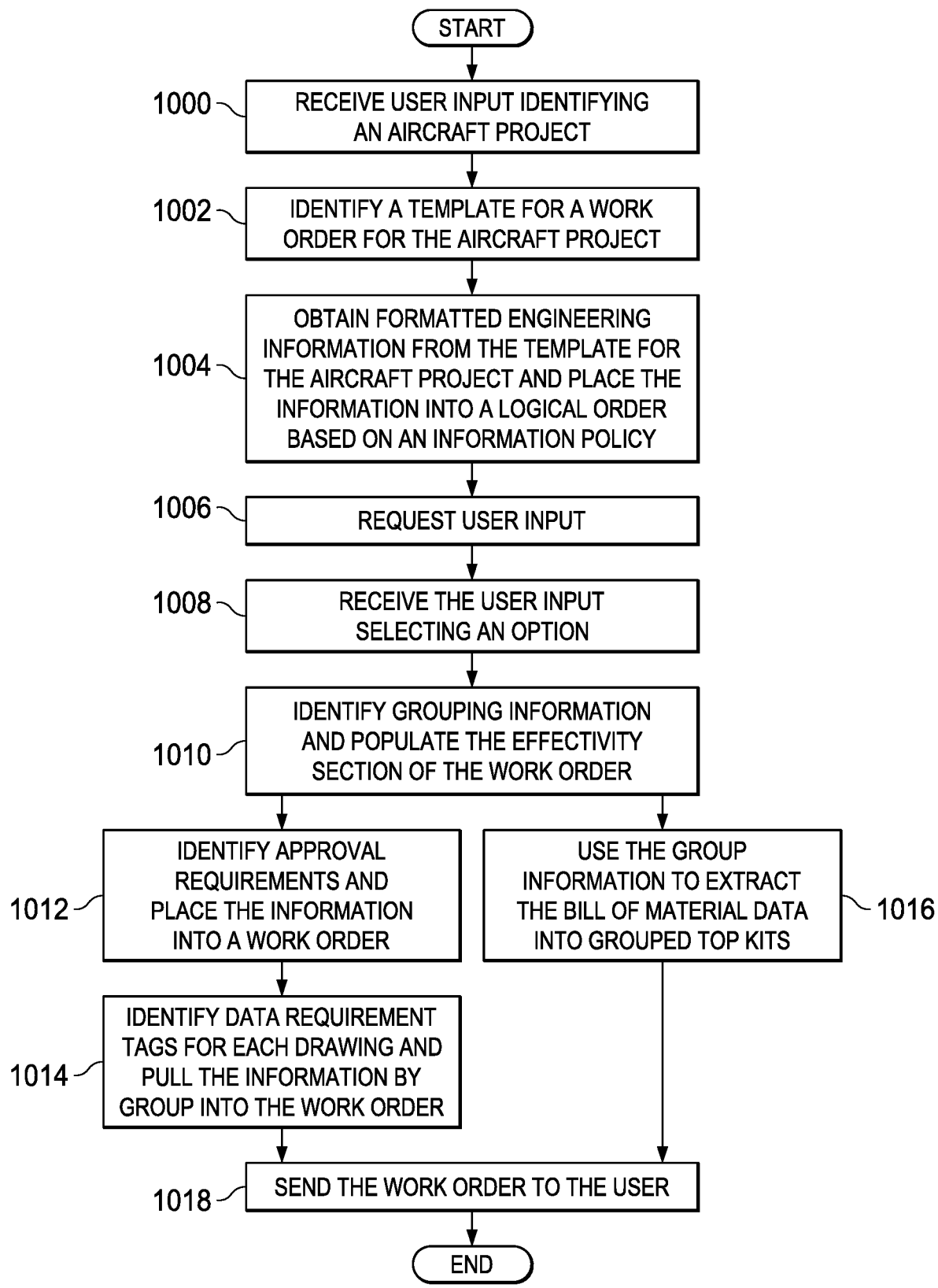
FIG. 10 is an illustration of a flowchart of a process for generating a work order in accordance with an illustrative embodiment.

Turning now to FIG. 10, an illustration of a flowchart of a process for generating a work order is depicted in accordance with an illustrative embodiment. The process illustrated in FIG. 10 may be implemented in work order manager 112 shown in block form in FIG. 1. The different operations may be implemented in software, hardware, or some combination thereof to perform the different operations.

The process begins by receiving user input identifying an aircraft project (operation 1000). The process identifies a template for a work order for the aircraft project (operation 1002). In this example, the template is one that is filled for the work order. The process obtains formatted engineering information from the template for the aircraft project and places the information into a logical order based on an information policy (operation 1004). The process then requests user input (operation 1006). The request allows a user an option to delete, keep, or reorder the formatted engineering information. The process receives the user input selecting an option (operation 1008).

The process identifies grouping information and populates the effectivity section of the work order (operation 1010). Grouping is used on a project that involves more than one aircraft and those aircraft have different incoming configurations and/or different outgoing configurations. If a project involves only one aircraft, or if a project involves multiple aircraft but all aircraft have the same incoming and outgoing configurations, then the work order will only contain one group. If a project involves multiple aircraft and those aircraft have different incoming configurations, different outgoing configurations, or both different incoming configurations and different outgoing configurations, then the work order will contain multiple groups. The group splits are driven by the different configurations.

Each configuration, in this example, requires a different drawing in the formatted engineering information. These configurations are tagged, allowing the tool to generate groupings in the work order. In this operation, the formatted engineering information is split for processing. In the first branch, the effectivity section identifies what aircraft are subject to the work order. The process then identifies approval requirements and places that information into the work order (operation 1012). This approval information may be located in a program management database separate from the template.

Next, the process identifies data requirement tags for each drawing and pulls the information by group into the work order (operation 1014). This information may include but is not limited to, revision information, effectivity, concurrent requirements, compliance time, manpower requirements, weight and balance information, electrical loads, data supplied drawings, reference manuals, bill of materials, work instructions, and drawings. As depicted, in this example, the tags are embedded extensible markup language (XML) information contained in the template file.

With reference again to operation 1010, in the second branch, the process uses the group information to extract the bill of material data into grouped top kits (operation 1016). Each drawing contains bill of material information. This bill of material information is used to create a sub kit. A kit is defined as a physical deliverable. The kit is a box of parts, shipped to the customer. The tool takes the bill of material information and groups all of the sub kits into top kits. A top kit can be defined as all of the parts necessary to modify one aircraft while a sub kit can be defined as all of the parts necessary to complete one task. The tool generates the top kits automatically to assist with parts procurement, organization, and shipment.

When both operation 1014 and operation 1016 are performed, the process sends the work order to the user (operation 1018). Operation 1018 may be performed by physically sending a hard copy of the work order to the user or by loading a digital copy onto an electronic delivery system. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram. For example, operation 402 and operation 404 of FIG. 4 may be performed in a different order or at substantially the same time.

Figure 11:
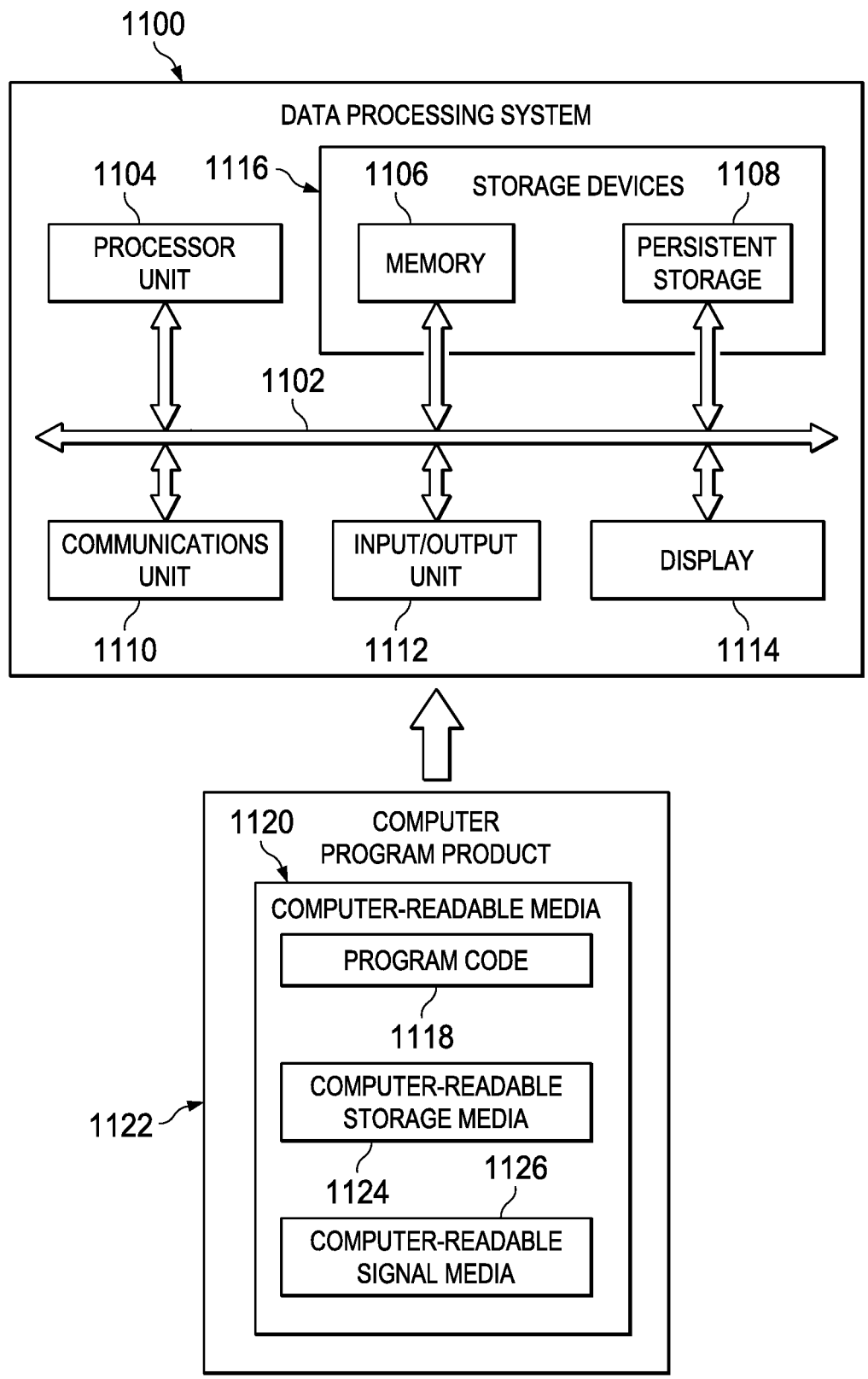
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more data processing systems within computer system 126 in FIG. 1. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be several processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1006 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples.

In one example, computer-readable media 1120 may be computer-readable storage media 1124 or computer-readable signal media 1126. In these illustrative examples, computer-readable storage media 1124 is a physical or tangible storage device used to store program code 1118 rather than a medium that propagates or transmits program code 1118.

For example, a template may be stored on computer-readable media storage 1124. The template comprises a data structure and program code configured to place engineering information into the data structure as formatted engineering information in the template using an information policy. The formatted engineering information includes instructions and drawings associated with tasks for an aircraft project and the template is used by a work order manager to create a work order for the aircraft project.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components, in addition to or in place of those illustrated, for data processing system 1000. Other components shown in FIG. 11 can be varied from the illustrative examples shown. The different embodiments may be implemented using any hardware device or system capable of running program code 1118.

Figure 12:
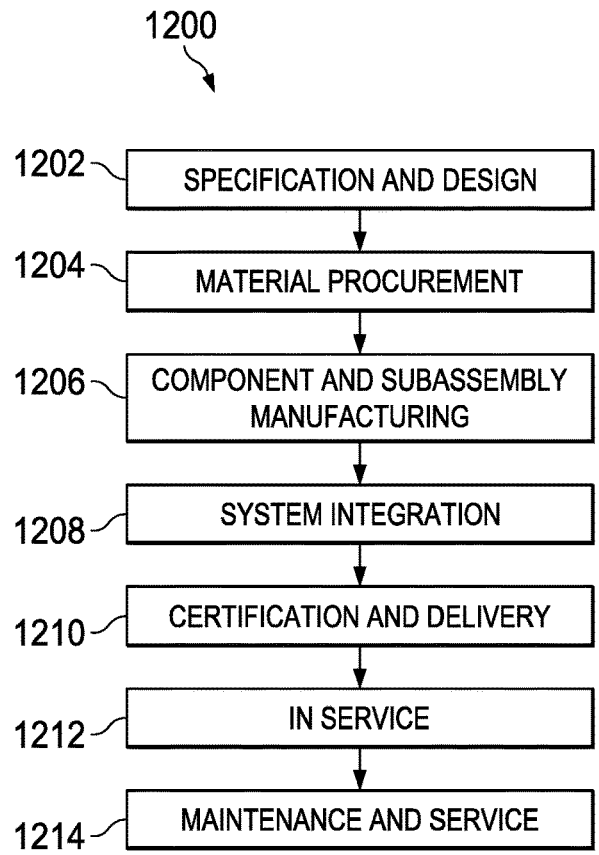
FIG. 12 is an illustration of a block diagram of an aircraft manufacturing and service method in accordance with an illustrative embodiment.
Figure 13:
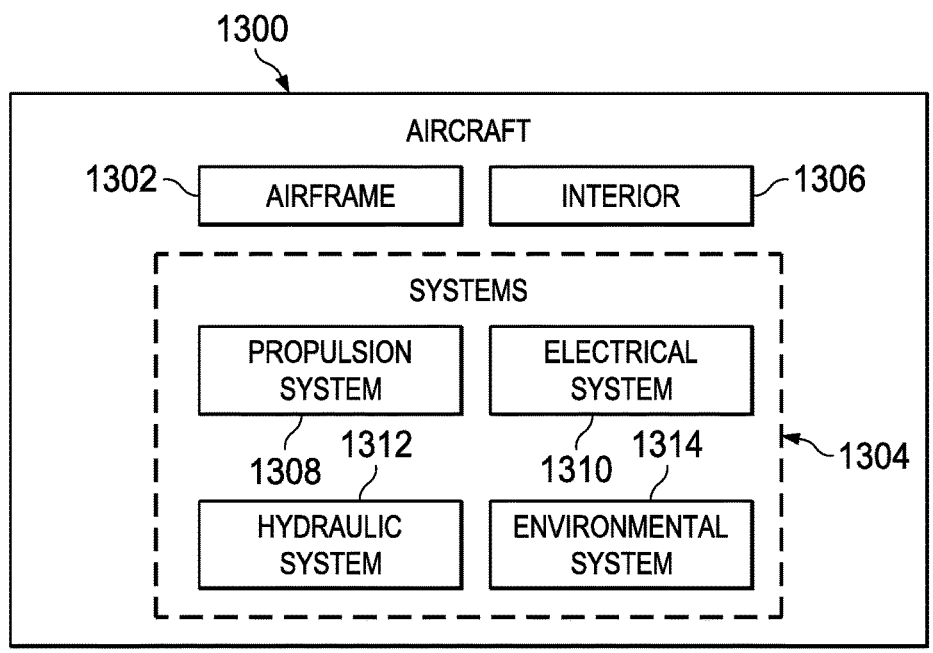
FIG. 13 is an illustration of a block diagram of an aircraft in which an illustrative embodiment may be implemented.

The illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with a plurality of systems 1304 and interior 1306. Examples of systems 1304 include one or more of propulsion system 1308, electrical system 1310, hydraulic system 1312, and environmental system 1314.

Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12.

One or more apparatus embodiments, method embodiments, or a combination thereof may be utilized while aircraft 1300 is in service 1212, during maintenance and service 1214 in FIG. 12, or both. The use of several the different illustrative embodiments may substantially expedite the assembly of aircraft 1300, reduce the cost of aircraft 1300, or both expedite the assembly of aircraft 1300 and reduce the cost of aircraft 1300.

Figure 14:
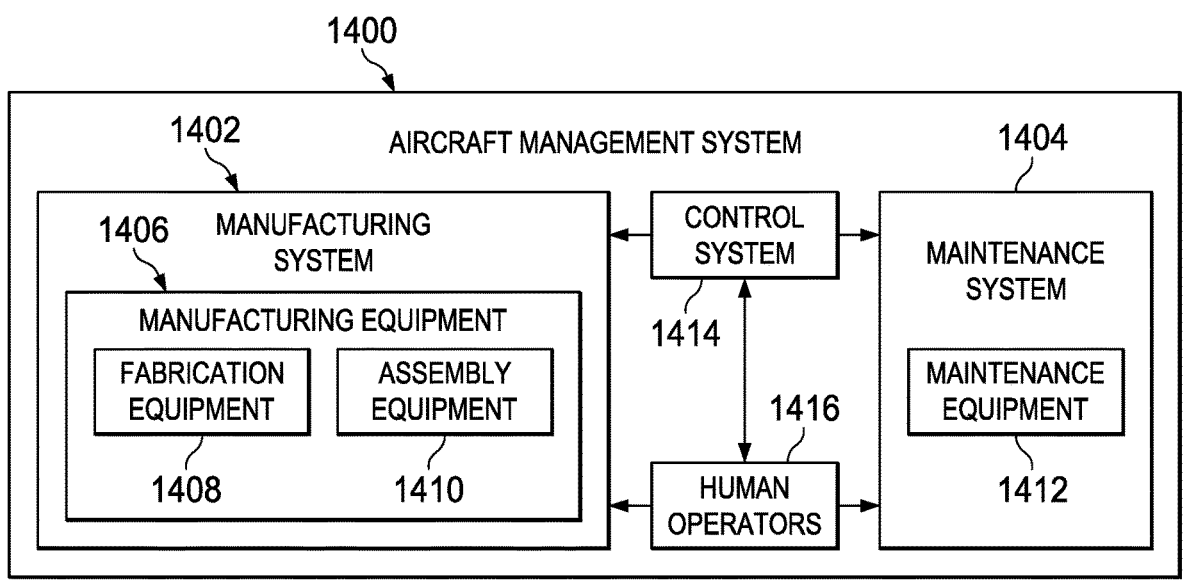
FIG. 14 is an illustration of a block diagram of a product management system in accordance with an illustrative embodiment.

Turning now to FIG. 14, an illustration of a block diagram of an aircraft management system is depicted in accordance with an illustrative embodiment. Aircraft management system 1400 is a physical hardware system. In this illustrative example, aircraft management system 1400 may include at least one of manufacturing system 1402 or maintenance system 1404.

Manufacturing system 1402 is configured to manufacture aircraft 1300 in FIG. 13. As depicted, manufacturing system 1402 includes manufacturing equipment 1406. Manufacturing equipment 1406 includes at least one of fabrication equipment 1408 or assembly equipment 1410.

Fabrication equipment 1408 is equipment that may be used to fabricate components for parts used to form aircraft 1300 in FIG. 13. For example, fabrication equipment 1408 may include machines and tools. These machines and tools may be at least one of a drill, a hydraulic press, a furnace, a mold, a composite tape laying machine, a vacuum system, a lathe, or other suitable types of equipment. Fabrication equipment 1408 may be used to fabricate at least one of metal parts, composite parts, semiconductors, circuits, fasteners, ribs, skin panels, spars, antennas, or other suitable types of parts.

Assembly equipment 1410 is equipment used to assemble parts to form aircraft 1300 in FIG. 13. In particular, assembly equipment 1410 may be used to assemble components and parts to form aircraft 1300 in FIG. 13. Assembly equipment 1410 also may include machines and tools. These machines and tools may be at least one of a robotic arm, a crawler, a faster installation system, a rail-based drilling system, or a robot. Assembly equipment 1410 may be used to assemble parts such as seats, horizontal stabilizers, wings, engines, engine housings, landing gear systems, and other parts for aircraft 1300 in FIG. 13.

In this illustrative example, maintenance system 1404 includes maintenance equipment 1412. Maintenance equipment 1412 may include any equipment needed to perform maintenance on aircraft 1300 in FIG. 13. Maintenance equipment 1412 may include tools for performing different operations on parts on aircraft 1300 in FIG. 13. These operations may include at least one of disassembling parts, refurbishing parts, inspecting parts, reworking parts, manufacturing replacement parts, or other operations for performing maintenance on aircraft 1300 in FIG. 13. These operations may be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable device. In some cases, maintenance equipment 1412 may include fabrication equipment 1408, assembly equipment 1410, or both to produce and assemble parts that may be needed for maintenance.

Aircraft management system 1400 also includes control system 1414. Control system 1414 is a hardware system and may also include software or other types of components. Control system 1414 is configured to control the operation of at least one of manufacturing system 1402 or maintenance system 1404. In particular, control system 1414 may control the operation of at least one of fabrication equipment 1408, assembly equipment 1410, or maintenance equipment 1412.

The hardware in control system 1414 may be using hardware that may include computers, circuits, networks, and other types of equipment. The control may take the form of direct control of manufacturing equipment 1406. For example, robots, computer-controlled machines, and other equipment may be controlled by control system 1414. In other illustrative examples, control system 1414 may manage operations performed by human operators 1416 in manufacturing or performing maintenance on aircraft 1300 in FIG. 13. For example, control system 1414 may assign tasks, provide instructions, display models, or perform other operations to manage operations performed by human operators 1416.

In these illustrative examples, work order manager 112 from FIG. 1 may be implemented in control system 1414 to manage at least one of the manufacturing or maintenance of aircraft 1300 in FIG. 13. For example, work order manager 112 in FIG. 1 may be used to control the performance of aircraft projects using the work order. Work order manager 112 in FIG. 1 may be used to create one or more work orders and assign tasks to different ones of human operators 1416 to control the performance of aircraft projects.

In the different illustrative examples, human operators 1416 may operate or interact with at least one of manufacturing equipment 1406, maintenance equipment 1412, or control system 1414. This interaction may be performed to manufacture aircraft 1300 in FIG. 13.

Of course, aircraft management system 1400 may be configured to manage other products other than aircraft 1300 in FIG. 13. Although aircraft management system 1400 has been described with respect to manufacturing in the aerospace industry, aircraft management system 1400 may be configured to manage products for other industries. For example, aircraft management system 1400 may be configured to manufacture products for the automotive industry as well as any other suitable industries.

Thus, the illustrative embodiments provide a method and apparatus of managing work orders. In one illustrative example, one or more technical solutions are present that overcome a technical problem with creating service bulletins for aircraft. As a result, one or more technical solutions may provide a technical effect enabling the creation of works orders to be at least one of more efficient or more accurate as compared to current techniques. One or more of the illustrative examples provide a technical solution that obtains and consolidates technical information, logically order that information, and reformat technical information as needed for use in creating work orders.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A work order system for aircraft projects, the work order system comprising:
    a computer system that comprises a template, customized for a customer, and a work order manager configured to:
        identify engineering information located at different locations that comprises a group of three-dimensional drawings for an aircraft project and generate formatted engineering information;
        associate the engineering information with a group of tasks, and place, based upon an information policy, the engineering information into the template, such that the information policy comprises an association priority that comprises: aircraft structure, environmental control subsystems, electrical subsystems, payload, and interior subsystems;
        identify approval requirements based upon a program management database separate from the template;
        produce a two-dimensional drawing, converted from the group of three-dimensional drawings, that comprises work instructions accessed to create a work order;
    create, based upon a work order policy, the work order to perform the group of tasks for the aircraft project from the template, such that the work order comprises the approval requirements and is customized for the customer on an aircraft; and
    automatically generate, from bill of material data extracted from the two-dimensional drawing, a top kit and sub kits that comprise parts needed, respectively, for the work order and for tasks therein.

2. The work order system of claim 1, wherein the engineering information is associated with the group of tasks for the work order such that each piece of the engineering information is associated, respectively, with a task in the group of tasks such that the formatted engineering information comprises:
    tags that comprise data requirements for the two-dimensional drawing; and
    the two-dimensional drawing derived from the group of three-dimensional drawings, such that the formatted engineering information is divided into categories that comprise: drawings, instructions, and a bill of materials.

3. The work order system of claim 2, wherein the work order manager selects an order for the group of tasks and creates the group of tasks with the order selected and populates an effectivity section of the work order based upon a configuration of an aircraft associated with the work order.

4. The work order system of claim 3, wherein the work order manager selects the order by reordering the group of tasks from an original order.

5. The work order system of claim 1, wherein the work order manager is configured to convert the group of three-dimensional drawings into separate two-dimensional drawings for each configuration based upon the information policy and the top kit comprises a physically deliverable box of parts.

6. The work order system of claim 1, wherein the information policy specifies a number and a view of two-dimensional drawings needed for the work order.

7. The work order system of claim 1, wherein the information policy is integrated within the template.

8. The work order system of claim 1, wherein the template comprises:
    a data structure; and
    program code configured to place the engineering information into the data structure in the template using the information policy.

9. The work order system of claim 1, wherein the work order is a service bulletin based upon the formatted engineering information extracted based upon tags in the formatted engineering information.

10. The work order system of claim 1, wherein the engineering information includes at least one of: instructions, part notes, annotation notes, a bill of materials, or part identifiers.

11. The work order system of claim 1, wherein the aircraft project is selected from a group that consists of: a modification, a reconfiguration, a refurbishment, and a maintenance project.

12. The work order system of claim 1, wherein the engineering information is located in a computer-aided design system and a part management system.

13. A method for managing work orders, the method comprising a work order manager in a computer system:
identifying engineering information located at different locations and comprising a group of three-dimensional drawings for an aircraft project and generating formatted engineering information;
associating, using an information policy, the engineering information with a group of tasks;
placing, using the information policy, the engineering information into a template;
identifying approval requirements based upon a program management database separate from the template;
producing a two-dimensional drawing, converted from the group of three-dimensional drawings, comprising work instructions for creating a work order;
creating, using a work order policy, the work order for performing the group of tasks for the aircraft project from the template, the work order being customized for a customer and comprising the approval requirements; and
enabling performing tasks for the aircraft project on an aircraft via at least automatically generating, from bill of material data extracted from the two-dimensional drawing, a top kit and sub kits that comprise parts needed, respectively, for the work order and for tasks therein.

14. The method of claim 13 further comprising:
the information policy comprising an association priority comprising: aircraft structure, environmental control subsystems, electrical subsystems, payload, and interior subsystems controlling performance of the aircraft project using the work order.

15. The method of claim 13 further comprising:
associating the engineering information with the group of tasks for the work order such that each piece of the engineering information is associated with a task in the group of tasks.

16. The method of claim 15 further comprising:
selecting an order for the group of tasks; and
creating the group of tasks with the order selected.

17. The method of claim 16, wherein the order is selected by reordering the group of tasks from an original order.

18. The method of claim 13, further comprising converting the group of three-dimensional drawings into two-dimensional drawings using the information policy.

19. The method of claim 13, wherein the information policy specifies views needed for two-dimensional drawings needed for the work order.

20. The method of claim 13, wherein the information policy is integrated within the template.

21. The method of claim 13, wherein the template comprises a data structure and program code configured to place the engineering information into the data structure in the template using the information policy.

22. The method of claim 13, wherein the work order comprises a service bulletin comprising an effectivity section populated using a configuration of an aircraft affected by the aircraft project.

23. The method of claim 13, wherein the engineering information includes at least one of: instructions, part notes, annotation notes, or part identifiers.

24. A method for managing work orders, the method comprising a computer system:
identifying engineering information, comprising a group of three-dimensional drawings, for an aircraft project;
converting, using an information policy, three-dimensional drawings into two-dimensional drawings with a view specified for each two-dimensional drawing in the two-dimensional drawings and comprising work instructions for creating a work;
associating tags and categories with the engineering information and generating formatted engineering information;
placing, using the information policy, the engineering information into a template;
identifying approval requirements based upon a program management database separate from the template;
sending the template to a work order manager, enabling the work order manager to create the work order using the template, such that the work order comprises the approval requirements and is customized for a customer; and
automatically generating, from bill of material data, a top kit and sub kits comprising parts needed, respectively, for the work order and for tasks therein.

25. The method of claim 24, wherein the categories comprise:
drawings, instructions, and a bill of materials, and the work order manager is located at one of:
an aircraft manufacturer, a third party, a third-party parts supplier, and the customer.

26. An aircraft management system that comprises:
a control system configured to control a manufacturing system or a maintenance system and to:
identify engineering information located at different locations that comprises a group of three-dimensional drawings for an aircraft project;
associate, based upon an information policy, the engineering information with a group of tasks, such that the information policy comprises an association priority of: aircraft structure, environmental control subsystems, electrical subsystems, payload, and interior subsystems;
identify approval requirements based upon a program management database separate from a template in a computer system that comprises a work order manager configured to identify the engineering information;
generate formatted engineering information divided into categories that comprise: drawings, instructions, and a bill of materials;
place, based on the information policy, the formatted engineering information into a template;
produce a two-dimensional drawing, converted from the group of three-dimensional drawings, that comprises work instructions accessed to create a work order;
create, based upon a work order policy, the work order from the template, such that the work order comprises the approval requirements;
automatically generate, from bill of material data extracted from the two-dimensional drawing, a top kit and sub kits that comprise parts needed, respectively, for the work order and for tasks therein; and control based on the work order, performance of tasks for the aircraft project on an aircraft.

27. The aircraft management system of claim 26 further comprising:
equipment selected from at least one of fabrication, assembly, or maintenance equipment.

28. A work order management system that comprises:
a non-transitory computer-readable storage media; and
a template stored on the non-transitory computer-readable storage media, wherein the template comprises a data structure and program code configured to:
associate, based on an information policy, engineering information with a group of tasks, and place, based upon the information policy, the engineering information into the template, such that the information policy comprises an association priority of: aircraft structure, environmental control subsystems, electrical subsystems, payload, and interior subsystems;
identify approval requirements based upon a program management database separate from the template;
place, based on the information policy, the engineering information located at different locations that comprises a group of three-dimensional drawings into the data structure as formatted engineering information in the template, wherein the formatted engineering information comprises tags, and categories that comprise: a bill of materials, instructions, and drawings, associated with tasks for an aircraft project, such that the template is configured for use by a work order manager to create, based upon a work order policy, a work order for the aircraft project;
produce a two-dimensional drawing, converted from the group of three-dimensional drawings, that comprises work instructions accessed to create the work order; and
automatically generate, from bill of material data extracted from the two-dimensional drawing, a top kit and sub kits that comprise parts needed, respectively, for the work order and for tasks therein.

* * * * *